United States Patent
Kaminaga et al.

(10) Patent No.: US 8,832,900 B2
(45) Date of Patent: Sep. 16, 2014

(54) WINDSHIELD WASHER SYSTEM

(71) Applicant: Fuji Jukogyo Kabushiki Kaisha, Tokyo (JP)

(72) Inventors: Kazuhiro Kaminaga, Tokyo (JP); Koichi Mashiko, Tokyo (JP); Isamu Nagasawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/845,837

(22) Filed: Mar. 18, 2013

(65) Prior Publication Data

US 2013/0255024 A1   Oct. 3, 2013

(30) Foreign Application Priority Data

Mar. 30, 2012   (JP) ................. 2012-080194

(51) Int. Cl.
- *B60S 1/52* (2006.01)
- *B60S 1/46* (2006.01)
- *B60S 1/08* (2006.01)
- *B60S 1/48* (2006.01)

(52) U.S. Cl.
CPC .. *B60S 1/52* (2013.01); *B60S 1/522* (2013.01); *B60S 1/0848* (2013.01); *B60S 1/483* (2013.01)
USPC ................ 15/250.04; 15/250.01; 15/250.001; 239/284.1

(58) Field of Classification Search
CPC .............. B60S 1/46; B60S 1/48; B60S 1/481; B60S 1/482; B60S 1/485; B60S 1/52; B60S 1/522; B60S 1/524; B60S 1/0844; B60S 1/0848; B05B 1/10
USPC ........ 15/250.04, 250.01, 250.001; 239/281.4, 239/284.2; 382/104
See application file for complete search history.

(56) References Cited

U.S. PATENT DOCUMENTS

| 7,014,131 B2* | 3/2006 | Berning et al. ............ 239/589.1 |
| 2005/0206511 A1* | 9/2005 | Heenan et al. ............... 340/438 |
| 2012/0280060 A1* | 11/2012 | Renke et al. ............... 239/284.1 |
| 2013/0037627 A1* | 2/2013 | Kikuta et al. .............. 239/284.1 |

FOREIGN PATENT DOCUMENTS

| JP | H09-66803 A | 3/1997 |
| JP | H10-194091 A | 7/1998 |
| JP | 2008-137548 A | 6/2008 |

* cited by examiner

*Primary Examiner* — Gary Graham
(74) *Attorney, Agent, or Firm* — Troutman Sanders LLP

(57) ABSTRACT

There is provided a windshield washer system. The windshield washer system includes: washer nozzles for injecting washer fluid onto a top portion of a windshield, in which an imaging area is included in a field of view of an imaging device that is located in a vehicle cabin; and a washer fluid supplier for supplying the washer fluid to the washer nozzles by pressurizing the washer fluid. The washer nozzles include a first nozzle having a spray pattern covering an area other than the imaging area and a second nozzle having a spray pattern covering the imaging area. The spray pattern of the second nozzle is narrower than the spray pattern of the first nozzle.

10 Claims, 2 Drawing Sheets

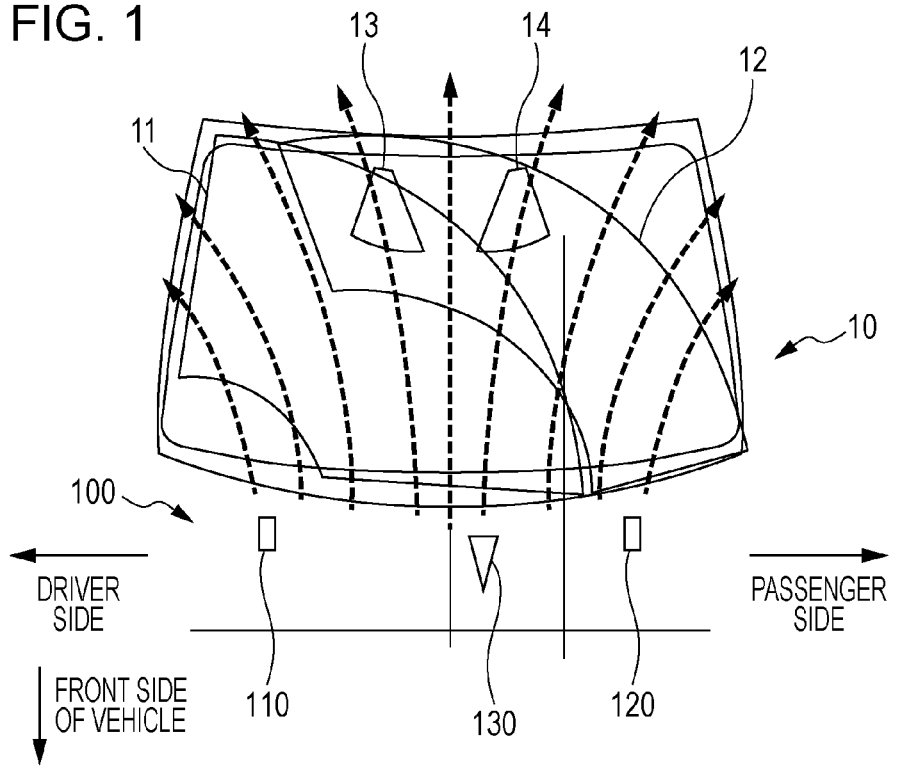
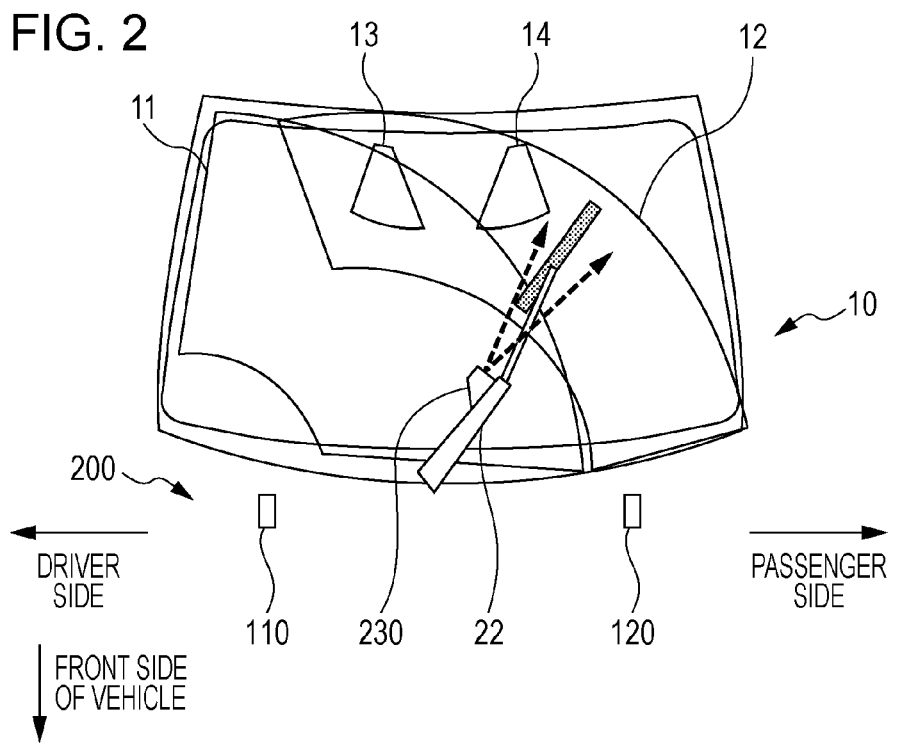

WINDSHIELD WASHER SYSTEM

CROSS-REFERENCE TO RELATED APPLICATIONS

The present application claims priority from Japanese Patent Application No. 2012-080194 filed on Mar. 30, 2012, the entire contents of which are hereby incorporated by reference.

BACKGROUND OF THE INVENTION

1. Field of the Invention

The present invention relates to a windshield washer system that injects washer fluid onto a front windshield of a vehicle such as an automobile and particularly relates to a windshield washer system that effectively cleans an area in front of an imaging device located on an interior side of a front windshield.

2. Description of the Related Art

A vehicle such as an automobile is provided with a windshield washer system that injects washer fluid (cleaning fluid) onto a front windshield.

As a related art concerning such a windshield washer system, for example, in Japanese Unexamined Patent Application Publication (JP-A) No. H10-194091, a nozzle located at a single position that injects washer fluid onto three predetermined areas on a front windshield is disclosed.

In JP-A No. 2008-137548, a windshield washer system is disclosed in which injection force is controlled on the basis of recognition results obtained by an object recognition apparatus that can recognize any object around a vehicle in order to prevent splash of washer fluid toward the object.

Recently, the adoption of such an outside recognition apparatus has also become widespread. The outside recognition apparatus has an imaging device such as a stereo camera assembly that is located adjacent to the inner surface of the front windshield so as to recognize external conditions in front of the vehicle.

As a related art concerning such an outside recognition apparatus, for example, in JP-A No. H9-66803, disclosed is an outside recognition apparatus having a stereo camera assembly that monitors rainwater splashed by a preceding vehicle while moving in rainy weather and controls the wiping speed of a wiper in response to the condition of the splash.

An imaging device for the outside recognition apparatus is generally arranged in an area adjacent to a central top portion of the front windshield.

In the case where dirt adheres to such an area, a common windshield washer system that diffuses the washer fluid over an entire surface of the windshield cannot supply a sufficient amount of the washer fluid over the area in front of the imaging device and problems may arise when using the outside recognition apparatus.

SUMMARY OF THE INVENTION

A first aspect of the present invention is a windshield washer system including: washer nozzles for injecting washer fluid onto a top portion of a windshield, in which an imaging area is included in a field of view of an imaging device that is located in a vehicle cabin; and a washer fluid supplier for supplying the washer fluid to the washer nozzles by pressurizing the washer fluid. The washer nozzles include a first nozzle having a spray pattern covering main area of the windshield other than the imaging area and a second nozzle having a spray pattern mainly covering the imaging area. The spray pattern of the second nozzle is narrower than that of the first nozzle.

According to the first aspect of the present invention, it is possible to effectively clean an imaging area in front of the imaging device, since the second nozzle can sufficiently supply the washer fluid to the imaging area.

Preferably, the imaging device is a stereo camera assembly having a pair of cameras that are located near the top portion of the front windshield and are spaced apart from each other in a width direction of a vehicle. The second nozzle has a spray pattern mainly covering an imaging area for a passenger-side camera.

Usually, a wiper arm has a rotary center at a driver-side. Consequently, it is difficult to clean an imaging area at a passenger-side.

However, since the second nozzle has a spray pattern mainly covering the imaging area at the passenger-side, the imaging area can be effectively cleaned.

Preferably, the second nozzle is secured to a vehicle body and is disposed at any position from the center of the vehicle body in the width direction of the vehicle to the imaging area.

Accordingly, it is possible to suitably inject the washer fluid from the second nozzle onto an imaging area.

Preferably, the second nozzle is disposed, with respect to the imaging area, at an upstream side of an air flow running along an outer surface of the vehicle body when the vehicle is moving.

Accordingly, it is possible to precisely clean the imaging area, since the washer fluid injected from the second nozzle is carried together with an air flow when the vehicle is moving.

Preferably, the second nozzle is provided on one of a blade and an arm of a wiper that cleans the windshield.

Accordingly, it is possible to more precisely clean the imaging area, since the washer fluid can be injected from a position near the imaging area.

Preferably, the washer fluid supplier may intermittently supply the washer fluid to the second nozzle immediately before the blade passes the imaging area and thereafter stops supply of the washer fluid.

Accordingly, it is possible to effectively utilize the washer fluid, since the second nozzle can stop supply of the washer fluid when the blade wipes the area other than the imaging area.

BRIEF DESCRIPTION OF THE DRAWINGS

FIG. 1 is an explanatory schematic view of a windshield washer system according to a first embodiment of the present invention;

FIG. 2 is an explanatory schematic view of a windshield washer system according to a second embodiment of the present invention.

DESCRIPTION OF THE PREFERRED EMBODIMENTS

Figure 3:
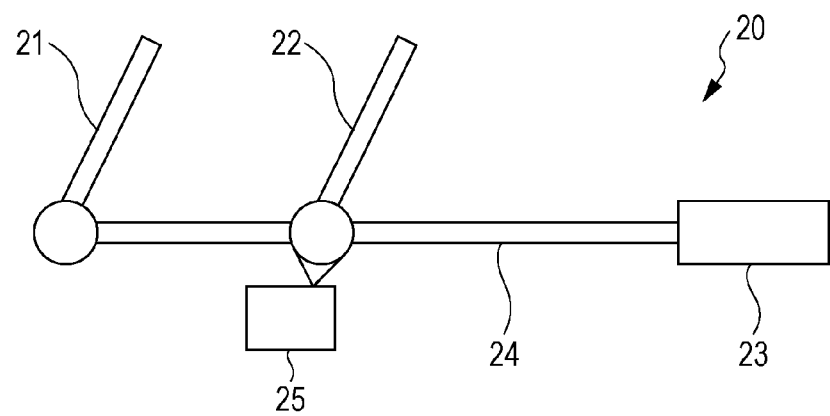
FIG. 3 is an explanatory schematic view of a wiper in the windshield washer system according to the second embodiment of the present invention.

The object of the present invention is to provide a windshield washer system that can effectively clean an area in front of an imaging device arranged on an interior side of a front windshield. The object can be achieved by a combination of a first nozzle that diffuses washer fluid over a wide area on the front windshield and a second nozzle that injects the washer fluid onto a small area near the imaging device.

First Embodiment

A first embodiment of a windshield washer system according to the present invention will be described below.

A windshield washer system 100 in the first embodiment is provided on, for example, a front windshield of a motor vehicle such as a passenger car.

FIG. 1 is an explanatory schematic view of the windshield washer system 100 according to the first embodiment of the present invention.

A front windshield 10 is provided on a front side in a vehicle cabin and is made of, for example, a laminated glass having a two-dimensional curved surface.

FIG. 1 is a perspective view seen from the front of a windshield of a right-hand drive vehicle. In the case of a left-hand drive vehicle, the right side may be changed to be the left side in FIG. 1.

An area of the front windshield 10 has a driver-side wiping-off area 11, a passenger-side wiping-off area 12, a driver-side imaging area 13, and a passenger-side imaging area 14.

Each of a driver-side wiper and a passenger-side wiper includes a wiper arm that has a rotary center at a driver-side when the arm is retracted, and a wiper blade attached to the wiper arm. Each of the wiping-off areas has a fan shape with a center corresponding to the rotary center of the respective wiper arm.

The driver-side wiping-off area 11 and passenger-side wiping-off area 12 are arranged so as to be superposed at an upper central portion of the front windshield 10 of the vehicle.

The driver-side imaging area 13 and passenger-side imaging area 14 are covered by respective fields of view of a driver-side camera and a passenger-side camera, which are included in a recognition apparatus disposed in a vehicle cabin to capture external images for detecting external conditions in front of the vehicle.

A pair of the driver-side camera and passenger-side camera constitutes a stereo camera assembly. The outside recognition apparatus can detect objects in front of the vehicle by means of image processing and can calculate the distance between a front end of the vehicle and the objects by utilizing a parallax effect between the cameras.

The driver-side imaging area 13 and passenger-side imaging area 14 are arranged on the front windshield 10 at a central portion thereof in the width direction of the vehicle near the top portion of the front windshield 10 and are spaced apart from each other in the width direction of the vehicle.

The windshield washer system 100 includes a driver-side diffusing nozzle 110, a passenger-side diffusing nozzle 120, a jet nozzle 130, a washer tank, and a washer pump.

The washer tank is a container that stores washer fluid.

The washer pump pressurizes the washer fluid in the washer tank and injects and supplies the fluid to the respective nozzles.

The driver-side diffusing nozzle 110 and passenger-side diffusing nozzle 120 spray the washer fluid over a wide area on the front windshield 10.

The driver-side diffusing nozzle 110 and passenger-side diffusing nozzle 120 are provided on a front hood or a cowl top panel of the vehicle and are spaced apart from each other in the width direction of the vehicle.

There is a case where the imaging area, in particular, the passenger-side imaging area 14 is not supplied with a sufficient amount of the washer fluid when only using the driver-side diffusing nozzle 110 and passenger-side diffusing nozzle 120 described above.

For this reason, the windshield washer system 100 of the first embodiment is provided with a jet nozzle 130 described below.

The jet nozzle 130 injects the washer fluid pressurized by and supplied from the washer pump in a substantially linear shape in sprayed pattern so that the passenger-side imaging area 14 becomes the main area to be sprayed.

The spray pattern of the jet nozzle 130 is narrower than that of the driver-side diffusing nozzle 110 and passenger-side diffusing nozzle 120.

The jet nozzle 130 is disposed between the driver-side diffusing nozzle 110 and the passenger-side diffusing nozzle 120.

FIG. 1 shows the direction of air flow running along the outer surface of a moving vehicle. The direction is indicated by arrows with broken lines.

The jet nozzle 130 is located at an upstream side in the air flow direction with respect to the passenger-side imaging area 14.

The jet nozzle 130 is also located at a passenger-side away from the center of the vehicle in the width direction and at a side further inward than the passenger-side imaging area 14 in the width direction of the vehicle.

According to the windshield washer system 100 of the first embodiment described above, it is possible for the jet nozzle 130 to inject the washer fluid onto the passenger-side area 14 effectively when the windshield washer system 100 is driven and it is possible to ensure the performance of the outside recognition apparatus.

It is also possible to clean the passenger-side imaging area 14 precisely, since the jet nozzle 130 is located at the upstream side of an air flow caused by the moving vehicle with respect to the passenger-side imaging area 14 and the washer fluid injected from the jet nozzle 130 is carried together with the air flow.

Second Embodiment

Next, a second embodiment of a windshield washer system 200 according to the present invention will be described below.

Descriptions of elements and positions in the second embodiment that are substantially the same as those of the first embodiment described above are omitted and these elements and positions are assigned the same signs. Main differences between the first and second embodiments are described below.

FIG. 2 is an explanatory schematic view of the windshield washer system 200 according to the second embodiment of the present invention.

FIG. 3 is an explanatory schematic view of a wiper in the windshield washer system 200 according to the second embodiment of the present invention.

The windshield washer system 200 in the second embodiment is provided with a diffusing nozzle 230 instead of the jet nozzle 130 in the first embodiment. The diffusing nozzle 230 is attached to a passenger-side wiper arm.

As shown in FIG. 3, a wiper 20 includes a driver-side wiper arm 21, a passenger-side wiper arm 22, a wiper motor 23, a linkage 24, and a microswitch 25.

The driver-side wiper arm 21 and passenger-side wiper arm 22 are provided on their distal ends with wiper blades and can swing about rotary centers to wipe the front windshield 10.

The wiper motor 23 is an electric actuator for swinging the driver-side wiper arm 21 and passenger-side wiper arm 22. The wiper motor 23 is controlled by a wiper relay and the like (not shown).

The linkage 24 converts a rotational motion of the wiper motor 23 to a reciprocating motion so as to transmit the reciprocating motion to the driver-side wiper arm 21 and passenger-side wiper arm 22.

The microswitch 25 is turned on only immediately before the wiper blade attached to the passenger-side wiper arm 22 passes the passenger-side imaging area 14.

For example, the microswitch 25 is actuated when a projection provided on a proximal end of the passenger-side wiper arm 22 pushes a switch.

The diffusing nozzle 230 injects and diffuses the washer fluid over both sides of the wiper blade attached to the passenger-side wiper arm 22.

A spray pattern of the diffusing nozzle 230 is narrower than that of the driver-side diffusing nozzle 110 and the passenger-side diffusing nozzle 120.

The diffusing nozzle 230 injects the washer fluid only when the microswitch 25 is turned on.

Although the diffusing nozzle 230 shown in FIG. 2 injects the washer fluid on both sides in a moving direction of the wiper blade (FIG. 2 shows an injection path indicated by the arrows with broken lines), the diffusing nozzle 230 may inject the washer fluid onto only one side in the moving direction of the wiper blade.

According to the windshield washer system 200 of the second embodiment described above, it is possible to inject the washer fluid from a position close to the passenger-side imaging area 14 and it is further possible to effectively clean the passenger-side imaging area 14, since the wiper blade can wipe the washer fluid immediately after injecting the washer fluid.

Alterable Embodiments

It should be noted that the present invention is not limited to the embodiments described above and that various kinds of alterations and modifications can be performed. These alterations and modifications can be included in the present invention.

The windshield washer system is not limited to the above structures and it can be altered, as required.

For example, positions, numbers, kinds, and the like of the nozzles are not limited to the above embodiments and they may be changed, as needed.

What is claimed is:

1. A windshield washer system comprising:
   washer nozzles for injecting washer fluid onto a top portion of a windshield, in which an imaging area is included in a field of view of an imaging device that is located in a vehicle cabin; and
   a washer fluid supplier for supplying the washer fluid to the washer nozzles by pressurizing the washer fluid;
   wherein the washer nozzles include a first nozzle having a spray pattern covering an area other than the imaging area and a second nozzle having a spray pattern covering the imaging area, and the spray pattern of the second nozzle is narrower than the spray pattern of the first nozzle.

2. The windshield washer system according to claim 1,
   wherein the imaging device is a stereo camera assembly having a pair of cameras that are located near the top portion of the front windshield and are spaced apart from each other in a width direction of a vehicle; and
   wherein the second nozzle has a spray pattern covering an imaging area for a passenger-side camera.

3. The windshield washer system according to claim 2, wherein the second nozzle is secured to a vehicle body and is arranged at any position from the center of the vehicle body in the width direction of the vehicle to the imaging area.

4. The windshield washer system according to claims 2, wherein the second nozzle is arranged with respect to the imaging area at an upstream side of an air flow running along an outer surface of the vehicle body when the vehicle is moving.

5. The windshield washer system according to claim 2, wherein the second nozzle is provided on one of a blade and an arm of a wiper that cleans the windshield.

6. The windshield washer system according to claim 5, wherein the washer fluid supplier intermittently supplies the washer fluid to the second nozzle immediately before the blade passes the imaging area and thereafter stops supply of the washer fluid.

7. The windshield washer system according to claim 1, wherein the second nozzle is secured to a vehicle body and is arranged at any position from the center of the vehicle body in the width direction of the vehicle to the imaging area.

8. The windshield washer system according to claims 1, wherein the second nozzle is arranged with respect to the imaging area at an upstream side of an air flow running along an outer surface of the vehicle body when the vehicle is moving.

9. The windshield washer system according to claim 1, wherein the second nozzle is provided on one of a blade and an arm of a wiper that cleans the windshield.

10. The windshield washer system according to claim 9, wherein the washer fluid supplier intermittently supplies the washer fluid to the second nozzle immediately before the blade passes the imaging area and thereafter stops supply of the washer fluid.

* * * * *